(12) United States Patent
Jerding

(10) Patent No.: US 6,463,586 B1
(45) Date of Patent: Oct. 8, 2002

(54) SERVICE NAVIGATION SYSTEMS AND METHODS

(75) Inventor: Dean F. Jerding, Roswell, GA (US)

(73) Assignee: Scientific-Atlanta, Inc., Lawrenceville, GA (US)

(*) Notice: Subject to any disclaimer, the term of this patent is extended or adjusted under 35 U.S.C. 154(b) by 0 days.

(21) Appl. No.: 09/346,190

(22) Filed: Jul. 1, 1999

(51) Int. Cl.[7] .......................... H04N 5/445; H04N 7/173
(52) U.S. Cl. ......................................... 725/37; 725/131
(58) Field of Search ........................... 725/37, 38, 39, 725/40, 44, 47, 52, 53, 61, 139, 140, 142, 131, 132, 144, 86, 100, 134; 345/327, 333, 352, 353, 354, 968, 357, 329; 707/104, 6; H04N 7/16, 7/173

(56) References Cited

U.S. PATENT DOCUMENTS

| 5,731,844 A | | 3/1998 | Rauch et al. |
| 6,005,561 A | * | 12/1999 | Hawkins et al. ............ 345/327 |
| 6,182,287 B1 | * | 1/2001 | Schneidewend et al. ...... 725/48 |

FOREIGN PATENT DOCUMENTS

| EP | 0 854 645 | 7/1998 |
| WO | WO 96/37966 | 11/1996 |
| WO | WO 97/48230 | 12/1997 |
| WO | WO 97/79237 | 12/1997 |
| WO | WO 98/12872 | 3/1998 |
| WO | WO 98/21877 | 5/1998 |
| WO | WO 98/47279 | 10/1998 |

OTHER PUBLICATIONS

U.S. patent application Ser. No. 6,118,443, Allison et al., filed Sep. 2000 (withdrawn).*

* cited by examiner

*Primary Examiner*—Chris Grant
(74) *Attorney, Agent, or Firm*—Hubert J. Barnhardt, III; Kenneth M. Massaroni; Shelley L. Couturier

(57) ABSTRACT

A terminal that facilitates efficient, flexible and user-friendly navigation of a plurality of program services provided by an associated television network. The terminal may be embodied in a home communication terminal (HCT) or other suitable device externally connected to a television or monitor, or as an integral component of a television or a computer. The terminal receives a user input identifying a user selected ordering scheme for the program services provided by the associated television system. The terminal either generates a display table or utilizes a previously generated display table, which in either case maps (i.e., orders) the program services as defined by a service table according to the selected ordering scheme for browsing by the subscriber. The ordering scheme is based upon at least one service attribute of the service information, such as the short description, long description, or service application associated with each program service.

25 Claims, 17 Drawing Sheets
SERVICE NAVIGATION SYSTEMS AND METHODS

FIELD OF THE INVENTION

The present invention generally relates to television systems, more particularly, to navigating television services provided by such systems.

BACKGROUND OF THE INVENTION

Until recently, television services comprised little more than analog broadcast video signals. Cable television systems received these signals from satellites and retransmitted them to subscribers over land-line networks, typically comprising fiber-optic cable and coaxial cable. However, with the recent advent of digital television, television systems are now capable of providing much more than the traditional analog broadcast video and the associated functionality. Digital television systems enable two-way and advanced one-way communications between the subscriber and the system headend. As a consequence, interactive services such as e-mail, interactive programming guides, advanced configuration controls, impulse pay-per-view, video-on-demand, e-commerce, and web browsing may be provided to subscribers of a digital television system. In addition to the interactive services, the increased bandwidth available through a digital television system has made it possible for the subscriber to have access to hundreds, or even thousands, of channels and/or services.

Digital television systems typically include a set top box, also referred to as a home communication terminal (HCT), which is connected to a cable or satellite television network. For purposes of the present disclosure, set top boxes, HCT's and other similar devices are collectively referred to herein as terminals. Terminals generally include the hardware and software necessary to provide the functionality of a digital television system at the subscriber's site. Preferably, the software executed by a terminal is downloaded and/or updated via the associated network. Terminals typically include a processor, communication component and memory, and are connected to a television or other suitable device, such as a personal computer. While many conventional terminals are standalone devices that are externally connected to a television, a terminal and/or its functionality may be integrated into a television or personal computer, as will be appreciated those of ordinary skill in the art.

With the many services that may be provided by a digital television system, there exists a need for an efficient and user-friendly means for selecting a programming or interactive service from the numerous choices available. Many television systems provide program information to the subscriber's terminal for viewing by the subscriber via the associated display device (i.e., television or computer monitor). For presentation purposes, the program information is typically organized into a program guide format that presents the program information by time and channel. The program guide can be used, for instance, to scroll through a listing of the available television channels, wherein the program information, such as name and description for each channel is presented at a current time. A more detailed description of such a program guide can be found in at least U.S. Pat. No. 5,850,218 to La Joie et al., the disclosure of which is incorporated herein by reference as if set forth in full.

While such program guides facilitate the selection of a particular program that the subscriber wishes to view or record at a particular time, they are generally limited to browsing the available program by channel number, that is, in a predefined sequential order. This is illustrative of the conventional paradigm of browsing television programs by channel number, with which we are all generally familiar.

However, with the hundreds, or even thousands, of channels that are or will be available with digital television systems, the task of browsing so many channels in a linear (i.e., numerically sequential) fashion by channel number may be daunting. Remembering just the 30 to 60 currently available channels is already beyond the capacity of many subscribers. While some subscribers may be able to associate a number of services or programs with specific channel numbers, it would seem reasonable to expect many subscribers to continue to depend upon the browsing for locating a service or program of interest.

It is known that some terminals provide a list of favorite channels defined by the subscriber. Much like favorites in a worldwide web (WWW) browser program, a list of favorite channels selected by the subscriber provides the subscriber with a relatively short listing of what are probably the most frequently visited channels by that subscriber. However, the programs or services offered by a television system may be changed by the system providers, thereby affecting the channels in the subscriber's list of favorites (which is most likely not when such changes occur). By analogy, if the content of a web page that is included in the list of favorites within a web browser program is moved to a new URL, the reference URL within the list of favorites is not automatically updated. Thus, the WWW user must track down the new URL and manually update the favorites list. Further, it is generally desirable to keep the favorite list small so that it does not become unmanageable, which may limit its flexibility and usefulness when the subscriber has access to a thousand or more services. A list of favorite channels is generally useful to help a subscriber return to a service that is frequently used, but these lists do not generally help the subscriber locate services in the first place.

Yet another alternative is browsing television channels by category as described in U.S. patent application Ser. No. 09/071,602, filed May 1, 1988, and assigned to the Assignee of the present invention. This methodology for browsing incorporates the association of channels with categories so that the subscriber can browse a listing of channels associated with a user selectable category. Of particular interest, the category of each channel is configured by the cable system, not by the user.

While the above described methods of browsing have some merit, there still exists a need for an efficient, flexible and user-friendly method for navigating a large number of services offered by television system, wherein the updates are completed automatically, and the user interface is intuitive and user driven.

SUMMARY OF THE INVENTION

The present invention provides for a terminal that facilitates efficient, flexible and user-friendly navigation of a plurality of services provided by an associated television network. The terminal may be embodied in a home communication terminal (HCT) or other suitable device externally connected to a television or monitor, or as an integral component of a television or a computer. The terminal receives user input identifying a user-selected ordering scheme for the services provided by the associated television system. The terminal either generates a display table or utilizes a previously generated display table, which in either case maps (i.e., orders) the services as defined by a service table according to the selected ordering scheme for browsing by the subscriber. The ordering scheme is based upon at least one service attribute of the service information, such as the short description, long description, or service application associated with each service. For example, a broadcast video service from The Weather Channel, Inc. would use a "watch TV" application, have a short description of "TWC", have a long description of "The Weather Channel." It would then have programs for each of the shows that are broadcast throughout a day.

The present invention enables the user to select an ordering scheme of services for browsing as opposed to the system operator defining the ordering scheme. This provides for service navigation in a manner that is not only familiar to the subscriber, but more powerful and extensible than mere channel number navigation. In particular, the subscriber may select from two or more predefined ordering schemes that will enable the user to individually select a preferred scheme for navigating the available services.

In accordance with an aspect of the present invention, a terminal for providing services to a user in a user-selected order, wherein each service is defined by service attributes, comprises a memory that stores a service table that relates service attributes (including the application providing the service) to each service, and a processor that receives a user inputted command identifying an ordering scheme for displaying the program services. In response to the user inputted command, the processor displays a listing of services based on a display table that maps the services of the service table according to the identified ordering scheme, wherein the ordering scheme is based on at least one service attribute. The terminal may further comprise a communication port that connects the terminal to a communications network distribution node, wherein the communication port receives an updated service table from the distribution node and stores the updated service table in the memory. The terminal may further include a search engine that searches one or more service attributes based on a user inputted search query, and generates therefrom a display table that maps the services that match the search query for displaying the search results to the user via a user interface. The service attributes upon which the ordering scheme may be based may include a long description, short description, and a service application that provides for each service.

The terminal may further comprise a user interface for displaying services according to the display table. A display device may be utilized to display the user interface based on the display table. The user interface may include a browser banner having a service listing portion at which at least one selectable service and its current program is displayed to the user. The service listing portion may include a pop-up list of services ordered according to an ordering scheme. A user input device such as a remote control or wireless keyboard may be utilized to receive user inputted commands for the processor.

In accordance with another aspect of the present invention, a navigator for allowing a user to access services in a user selected ordering scheme via a display, wherein each service is defined by its service description, comprises a navigator controller and a user interface. The navigator controller receives user inputted commands identifying an ordering scheme, and in response thereto displays a listing of services based on the display table mapping the services according to the identified ordering scheme. The ordering scheme may be based on at least one search attribute associated with each service. The navigator control may further comprise a search engine that searches the services based on a user inputted search query, and generates therefrom a display table that maps the services which match the search query for displaying the results to the user via the user interface.

The ordering scheme may also be specified at the network headend as a list of services and display formatting information (in a format such as the HyperText Markup Language (HTML)) that directs the navigator controller as to how the user interface is presented to the user. Based on the display formatting information, the subscriber can choose from the list of services using commands inputted from a device such as a remote control. The display formatting information may include images and audio that are downloaded to the terminal on-demand from the network. This particular ordering scheme may be selected by a dedicated button on a user input device such as a remote control. A further selection by the user may activate a list of programs available for a particular service.

In accordance with another aspect of the present invention, a method for dynamically ordering a plurality of services for display on a display device, wherein each service is defined by service attributes related to the service by a service table, comprises receiving a user input command identifying an ordering scheme for displaying the services, wherein the ordering scheme is based on at least one service attribute, and in response to the command, displaying a service listing to the user via the display device. The service listing displayed to the user may include the services ordered according to a display table that orders these services according to the selected ordering scheme. The step of generating the display table may include ordering the services according to a service description alphabetically, or according to a service application. The method may further include receiving an updated service table and re-ordering the display table based on the new service information.

Other features and advantages of the present invention will become apparent to one skilled in the art upon examination of the following drawings and detailed description. It is intended that all such features and advantages be included herein within the scope of the present invention as defined by the appended claims.

BRIEF DESCRIPTION OF THE DRAWINGS

The present invention can be better understood with reference to the following drawings. The elements of the drawings are not necessarily drawn to scale, emphasis instead being placed upon clearly illustrating the principles of the present invention. Furthermore, like reference numerals designate corresponding parts throughout the several views.

DETAILED DESCRIPTION OF THE PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1A:
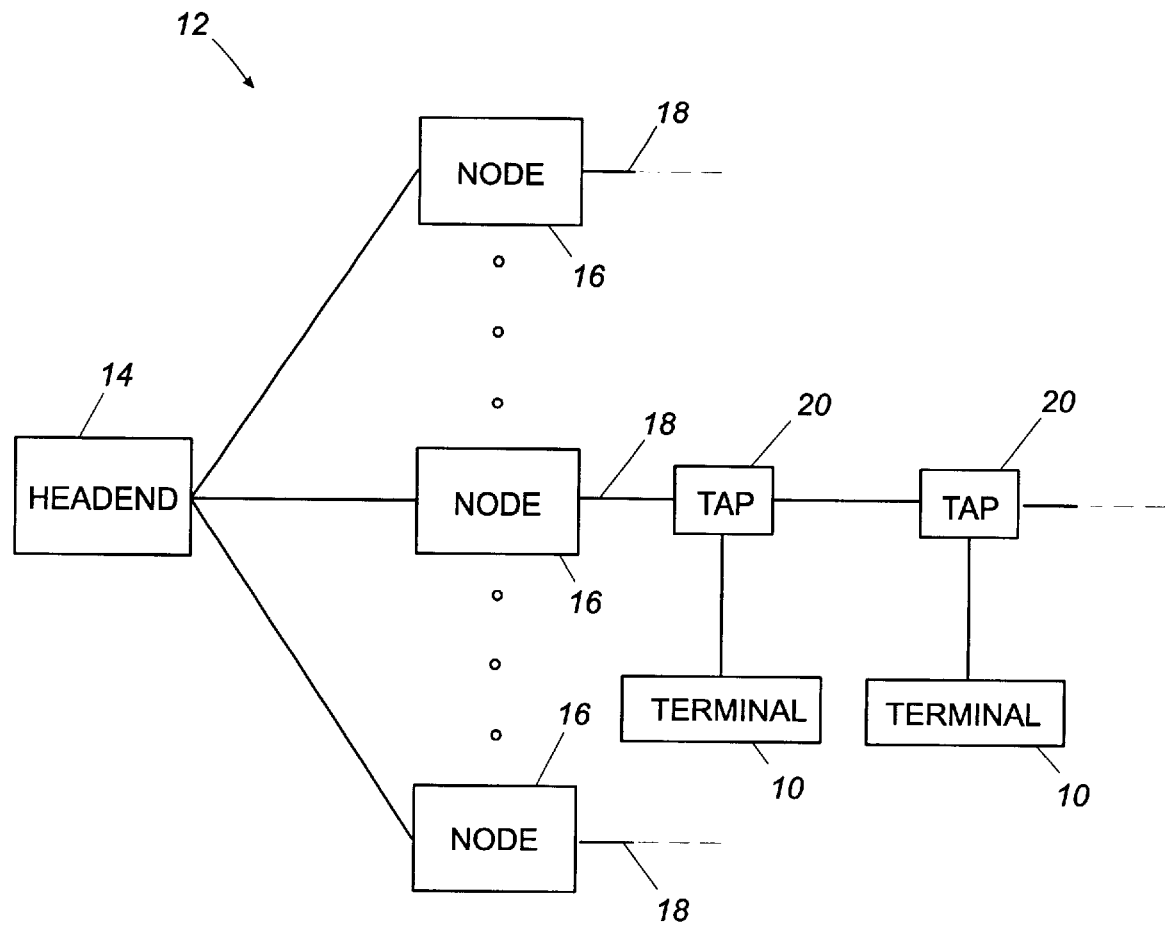
FIGS. 1A and 1B are block diagrams of television systems that incorporate terminals in accordance with an embodiment of the present invention

With reference to FIG. 1A a terminal 10 in accordance with the present invention is provided as a part of a television system 12 which includes a headend 14 for receiving satellite television signals, demodulating the signals down to a baseband, and transmitting the signals over the system 12. The transmitted signals, for instance, can be radio frequency (RF) signals, although they are more preferably optical signals that are transmitted over a communication medium such as fiber optic cable. When optical signals are transmitted by the headend 14, one or more distribution nodes 16 are included in the system 12 for converting the optical signals to RF signals that are thereafter routed over other media, such as coaxial cables 18. Taps 20 are provided within cable system 12 for splitting the RF signal off to subscriber terminals 10. The terminals 10 may comprise or be an integral component of a home communication terminal (HCT), a television, a video cassette recorder (VCR), a computer, or other suitable device, in accordance with the present invention.

Figure 1B:
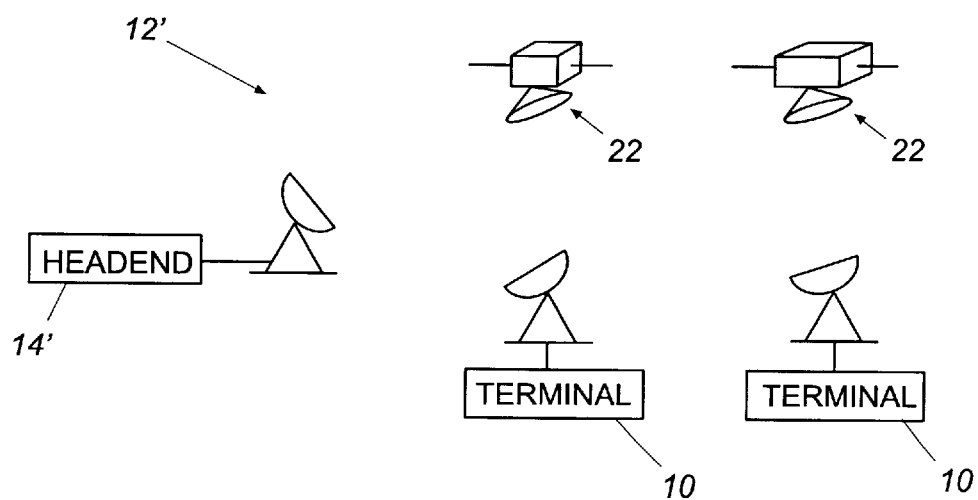

Similarly, FIG. 1B illustrates a television system 12' including a headend 14' that communicates with terminals 10 via one or more communications satellites 22, as well known to those of ordinary skill in the art. A more detailed description of a satellite based television system such as illustrated in FIG. 1B can be found in at least U.S. Pat. No. 5,073,930, issued to Green et al.

Figure 2:
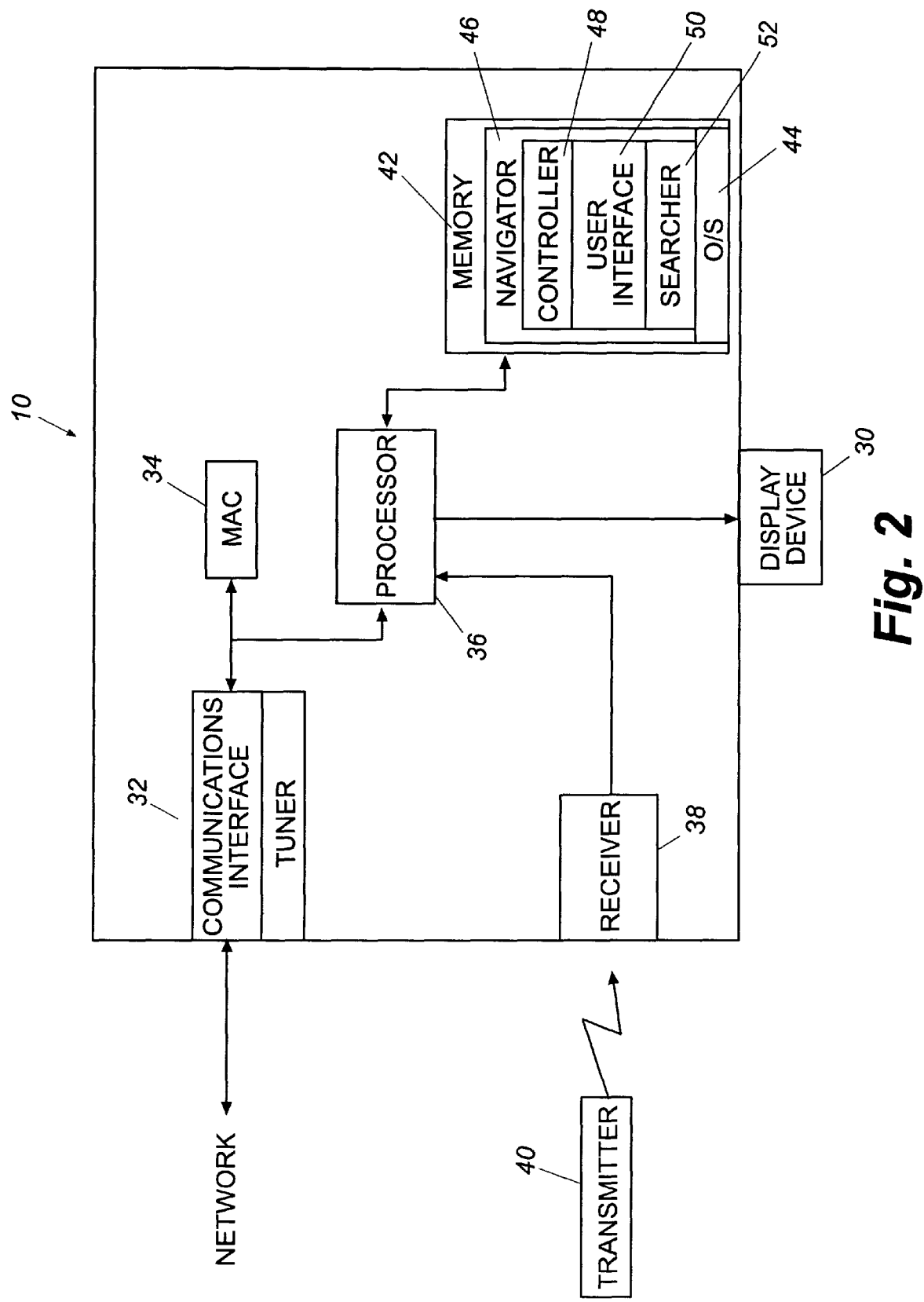
FIG. 2 is a schematic block diagram of a terminal in accordance with an embodiment of the present invention.

Referring to FIG. 2, an illustrative example of a terminal 10 along with other system equipment in accordance with the present invention is shown. The terminal 10 is typically situated within a residence or business of the subscriber. As previously mentioned, the terminal 10 may be integrated into a device that includes a display 30, such as a television set or personal computer, or may be a standalone device that can be coupled externally to a display device 30, such as a computer or a television. The terminal 10 processes signals received over a television network 12, 12' for presentation to a subscriber on the display device 30. The terminal preferably comprises a communications interface 32, a media access controller (MAC) 34, a processor 36, a receiver 38, and memory 42. The communications interface 32 receives the signals, which can include video, audio, and data information, transmitted over the television system 12, 12', and for providing reverse information over the television system 12, 12' for transmission back to the headend 14, 14'. The communication interface 32 preferably includes a tuner for accessing or tuning particular program services to be displayed by the display device 30. The MAC 34 is coupled to the communication interface 32 for MPEG decoding, graphics composition, and audio/video output, as well known in the industry. The processor 36 controls operation of the terminal 10 and drives the display device 30. The receiver 38 is coupled to the processor 36 and configured to receive externally-generated information, such as user inputs or commands from other devices, such as to a user input device 40. The user input device 40 can be any suitable device such as a hand-held remote control device or a wireless keyboard which can generate, for instance, infrared signals that are received by receiver 38. Preferably, the user input device 40 includes buttons or keys that can be selectively actuated by the subscriber for generating user inputs or command recognizable by terminal 10, as discussed in greater detail below in connection with FIG. 4.

The memory 42 is associated with the processor 36 and stores instructions which may be executed by processor 36 under the control of an operating system 44. An example of a suitable operating system is the PowerTV Operating System by PowerTV, Inc. of Cupertino, Calif. The memory 42 may also store service information that can, for instance, be downloaded over the television system 12, 12' to the terminal 10. The program information may include program guide information that is displayed to the subscriber in the format of a program guide listing of the channels by channel number, the respective programs for viewing on each the channel, and the times at which the programs are shown. The service information may also include service attributes, such as a long description, short description, and logo image, as discussed in greater detail below. In essence, the memory 42 stores whatever service information necessary to implement each service provided by the television system 12, 12'. It is further noted that the memory 42 may include several types of memory, for example, non-volatile memory (NVM), dynamic random access memory (DRAM), and static dynamic random access memory (SDRAM), including any combination thereof. Preferably, non-volatile memory is provided for storing operational parameters, user settings, etc., as will be appreciated by those of ordinary skill in the art.

A navigator 46 in accordance with an embodiment of the present invention is preferably stored in memory 42 as computer program code for execution by processor 36. The navigator 46 includes a controller 48, a user interface 50, and a searcher 52. The navigator 46 provides the functionality for providing efficient, flexible and user-friendly browsing by the subscriber. More specifically, the navigator 46, via the controller 48, monitors data on the network to determine if the service information stored in memory 42 needs to be updated (i.e., reloaded). In addition, the controller 48 utilizes services provided by the operating system 44 such as libraries stored in memory, for accessing broadcast data on the network (e.g., DSM-CC data carousels, or MPEG private data). In addition, the operating system 44 provides other services to the controller 48 such as drivers for rendering video on the display device 30, controlling the frequency to which the tuner is tuned, and other operation system tasks such as timing, scheduling, etc. The user interface 50 generates the interface by which the subscriber selects an ordering scheme methodology for navigating services in accordance with the present invention, or by which information is prevented to the subscriber, as described in greater detail below in connection with the screen displays of FIGS. 5–12. The searcher 52 processes search queries entered by the subscriber by identifying active services matching the user submitted query. The matching services may then be presented to the user via the subscriber user-interface 50.

At this point the service information stored in memory 42 is described in greater detail. Initially, the navigator 46 determines what program services are available on the television system 12, 12' for presentation to the subscriber. The navigator 46 downloads the service information for the available program services and preferably stores the information in memory 42. In addition, the navigator 46 may continuously monitor the television system 12, 12' for updates. The service information downloaded from the television system 12, 12' is typically broadcast rom one or more servers residing at the headend 14, 14'.

The service information association with each service typically comprises an application to run and a parameter (e.g, the data content, specific to that program service) for use by the application. Thus, two or more program services may be defined using the same application component, however, with different parameters. For example, an application that tunes video programming could be executed with a first set of parameters to view, for example, HBO, and a second set of parameters to view, for example, CNN. Each association of an application component (i.e., video tuning program) and a parameter component (i.e., HBO or CNN) identifies a unique service. The other services such as text channels, impulse pay-per-view, video on demand, and web browsing are each associated with an application, and the content for each service is defined by various parameters. In addition to an application and parameter, a service is further characterized or defined by other data, referred to herein as attributes. For instance, a service is typically defined by attributes such as an identifier to identify the service to the various software layers, a short description of the service (such as a station's call letters), a long description of the service, and a logo image.

Other attributes of certain embodiments can provide information the navigator 46 uses to present the service, such as an alternative service to launch if the original service is not authorized at a specific terminal, and whether or not the application providing the service should be downloaded from the headend 14, 14' when the terminal is powered on.

Additional attributes in certain embodiments may include multimedia attributes. For example, a service identity may be optionally augmented with an introductory audio that is played when the program service is launched. More specifically, a short audio welcome or closing message song or voice with musical background may be played.

Accordingly, each service is defined by a plurality of attributes, such as those described above, necessary for identifying and providing the service. It is recognized by those of ordinary skill in the art that various service definition data standards for communicating service information have been proposed and/or accepted, such as those described in Advanced Television System Community (ATSC) document A/56 entitled "System Information for Digital Television," and ATSC document A/65 entitled "Program and System Information for Terrestrial Broadcast and Cable and Service Definition."

Figure 3:
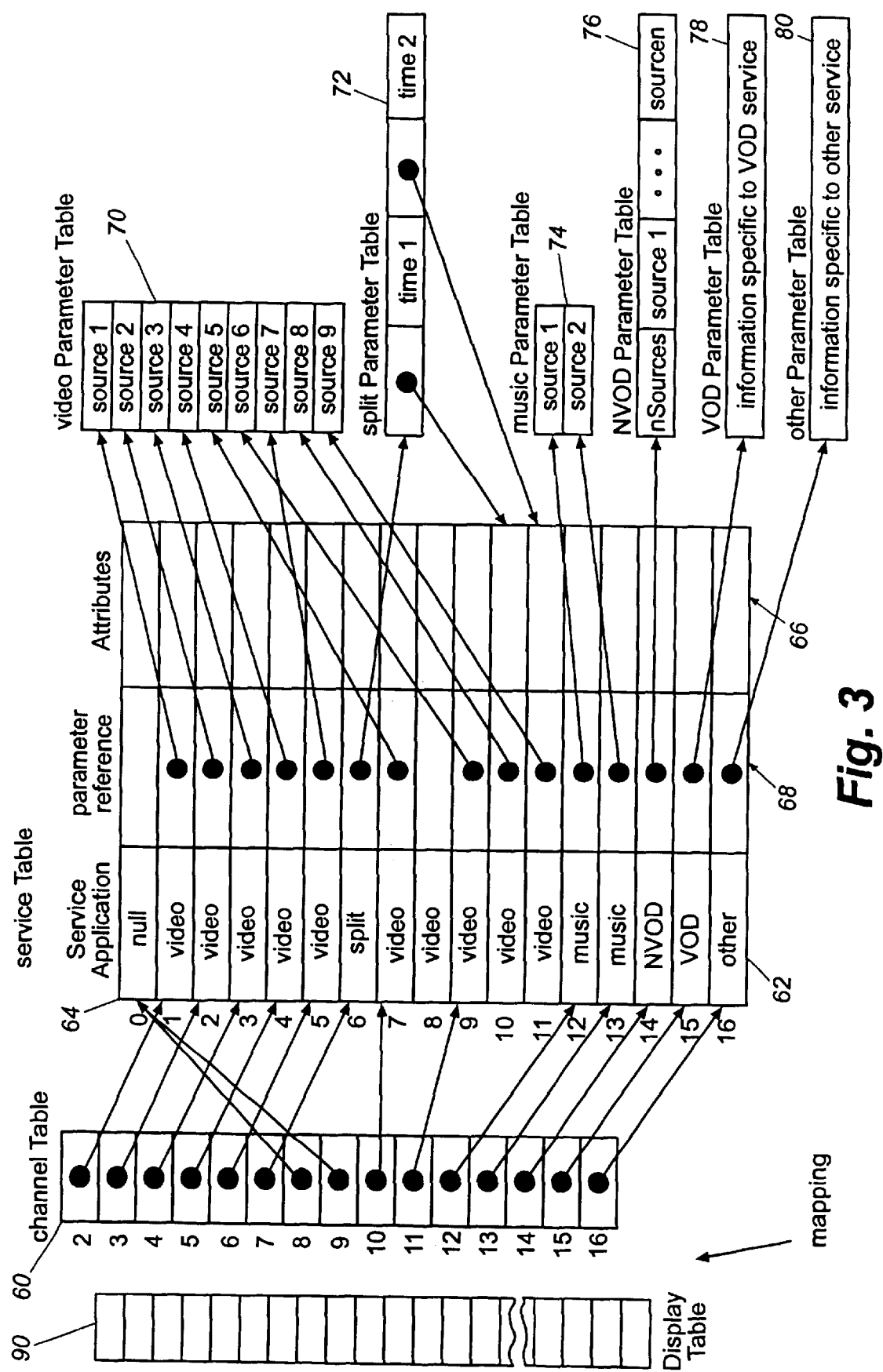
FIG. 3 is a data structure diagram illustrating various tables for service navigation in a television system in accordance with an embodiment of the present invention.

The service information for each program service, including the attributes, are typically communicated to the terminal 10 and stored in memory 42 in the form of a plurality of cross reference tables, as illustrated in FIG. 3. These tables cross reference channel numbers displayed to subscribers with a variety of services which, as mentioned above, may include various types of video and audio programming and interactive services. Transparent to the subscribers, and according to the relations defined by the cross reference tables, the selection of a channel transfers control to a specific application program that, along with one or more appropriate parameters obtained from the cross reference tables, activates (ie., displays on the selected channel) the service associated with that selected channel. The channel selection function advantageously enables the terminal 10 to process data from sources other than just traditional analog video broadcast sources. The other sources can include, for example, MPEG video, VBI, or IP.

Further to FIG. 3, a channel table 60 associates the numerical channels of the terminal 10 with a plurality of services listed in a service table 62. When a subscriber selects a channel, that channel is first identified in the channel table 60 where a pointer associates the channel with a particular service of the service table 62. For example, Channel 2 is associated with the Service 1, Channel 5 is associated with the Service 4, and Channel 8 is associated with the Service 0.

The service table 62 indicates the application program that is used to provide a service. For example, as shown in column 64, Services 1–5 are provided by the video or generic "watch TV" application, Service 13 is provided by the music application, and Service 15 is provided by the VOD application. Optionally, a channel does not have to be associated with a service, in which case, it is associated with the "null" Service 0 (e.g., Channels 8 and 9). Other service types, such as, for example, a home shopping service, a still image library service, an online database service, worldwide web service, and e-mail service are provided by additional types of application programs and can be added to service table 62, and are now represented in service table 62 by the "other" Service 16.

Service table 62 provides attribute information in an attributes column 66 for each program service listed. The information provided may include, for example, the service's logo, long description, short description, and program schedule, and can be used as a source for an information banner or an interactive program guide.

The service table 62 further provides parameter references in a parameter reference column 68 for identifying sources of the listed television services. The parameter references point to parameter tables, such as video parameter table 70, split parameter table 72, music parameter table 74, NVOD parameter table 76, VOD parameter table 78, and "other" parameter table 80, as described in detail in at least U.S. patent application Ser. No. 09/025,577, filed Feb. 18, 1998, and assigned to the assignees of the present invention, the disclosure of which is incorporated herein by reference as if set forth in full.

Several display tables 90 in accordance with the present invention map the services of service table 64 according to a user selected ordering scheme based on at least one attribute. Since the respective ordering schemes are based on different attributes, each separate ordering scheme utilizes a different display table 90. The different display tables 90 may be dynamically generated at run-time by processor 36 in response to a user input command identifying a particular ordering scheme. Alternatively, the display tables 90 may be pre-generated and stored in memory 42 for use when selected by the subscriber. Those display tables 90 stored in memory 42 are preferably automatically updated to continuously reflect the current ordering schemes and services should the channel table 60 or the service table 62 change.

For example, an illustrative ordering scheme in accordance with an embodiment of the present invention enables the subscriber to browse program services alphabetically by the short description. This ordering scheme provides for a browse mode that requires the program services to be ordered alphabetically by the short description specified by the system operator and included in the service information stored in column 66 of the service table 62. Thus, when the subscriber enters the browse mode and selects the ordering scheme calling for the program services to be listed alphabetically by short description, the appropriate display table 90 is accessed (or dynamically generated) and utilized to map the program services accordingly. The user interface 50 can then present a service listing of the program services in alphabetical order according to short description to the subscriber via the display device 30. Other alternative ordering schemes may include alphabetically a short description with logo, or alphabetically by long description. Of course, other ordering schemes may be utilized in accordance with the present invention. Advantageously, the present invention enables a subscriber to select the ordering scheme of choice for browsing the services rather than being limited to the services ordered in a single ordering scheme according to channel number as established by the system operator.

Figure 4:
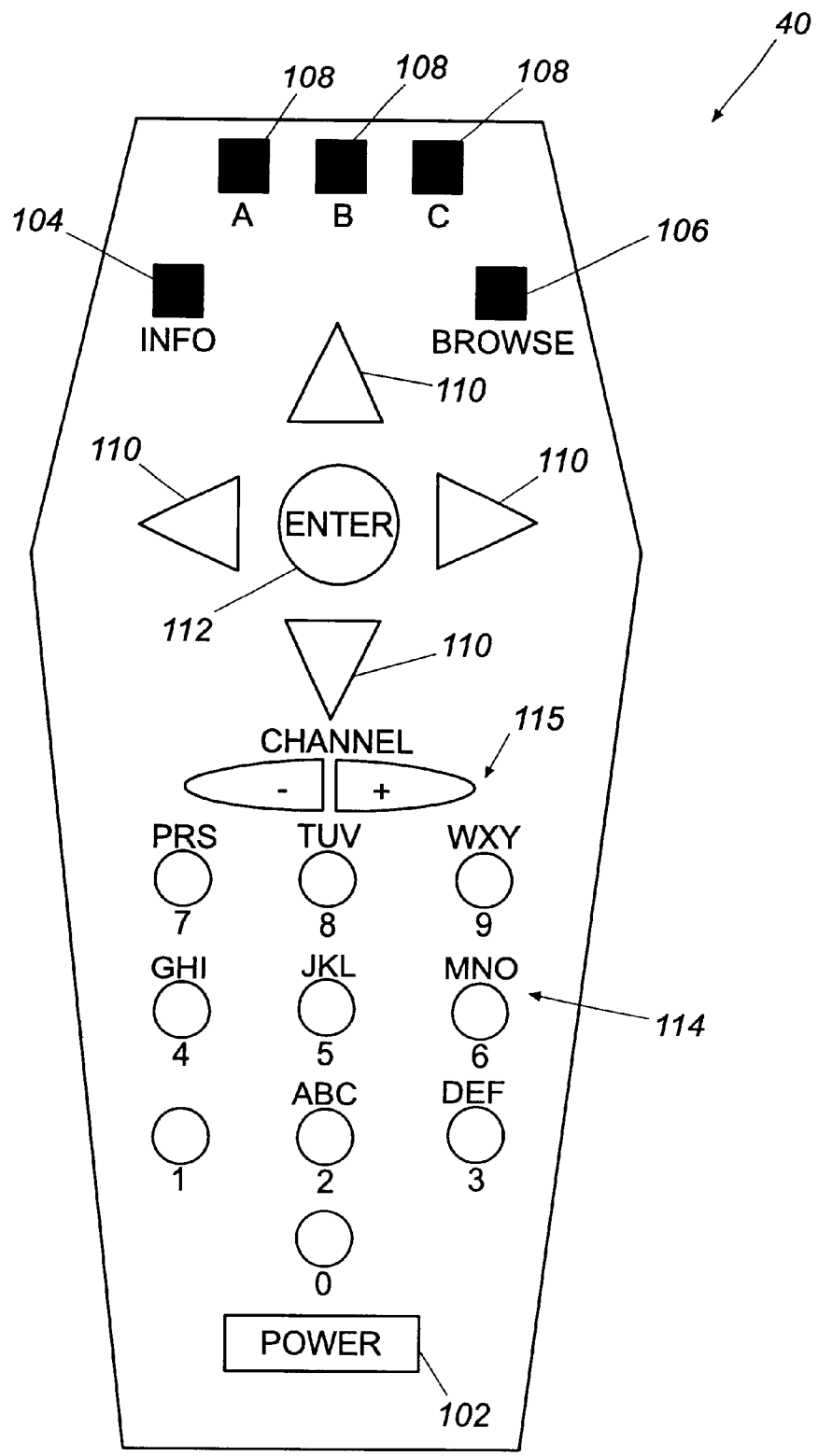
FIG. 4 is a top view of a user input device, such as a remote control, that can be used by a subscriber to input commands to the terminal of FIG. 2 in accordance with an embodiment of the present invention.

FIG. 4 illustrates an example of a user input device 40 suitable for use in connection with the present invention. The user input device 40 comprises a remote control transmitter capable of generating instruction and command signals recognizable by the terminal 10. It is noted that other alternative embodiments of a user input device suitable for use in connection with the present invention may be utilized, and may include, for example, a wireless keyboard. The user input device 40 includes a power key 102, an info key 104 for initiating display of information, a -browse key 106 for initiating and terminating a browser session, one or more function keys 108 for inputting programmed commands, scrolling or cursor keys 110, an enter key 112 for selecting a highlighted option, and an alphanumeric keypad 114 for inputting numerical and alpha information. In accordance with the present invention, the function keys 108 are programmed for pre-selected ordering schemes, as discussed in greater detail below. However, it should be noted that other input means could alternatively be provided, such as a voice recognition system programmed with the appropriate terms such as browse, select, up, down, etc. It is noted that the alphanumeric keypad 114 may be utilized to key in letters, whereby each key may be used to select one of three associate letters by actuating the key once for the first letter, twice for the second letter, or three times for the third letter, as is well known. Thus, a textual string may be inputted by the subscriber. Alternatively, the user input device may include a full alpha-numeric keyboard.

Figure 5:
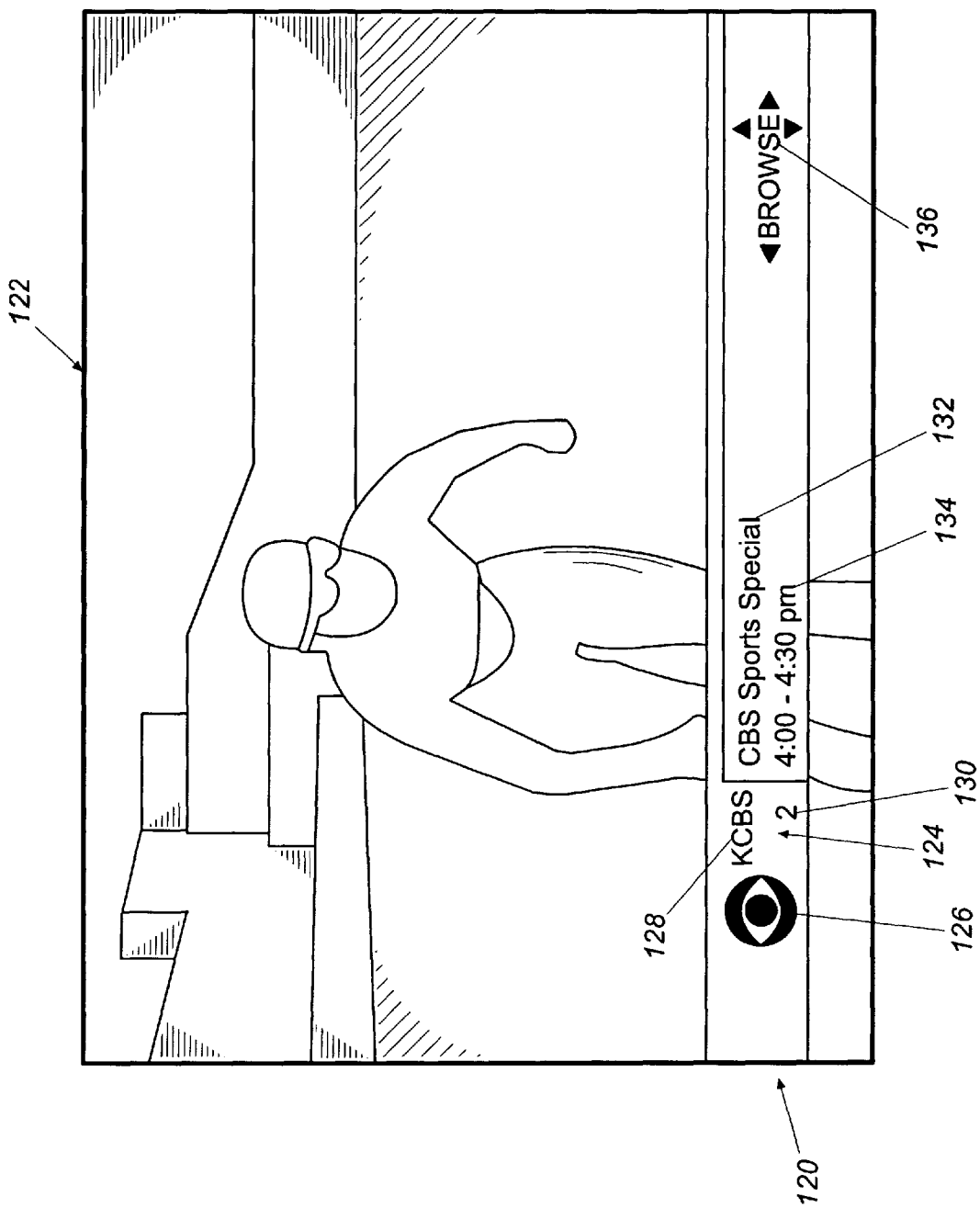
FIGS. 5–13 are illustrative screen displays that show user interfaces in accordance with an embodiment of the present invention.

With reference to FIGS. 5–13, the operation of an embodiment of the invention is described. The FIGS. 5–13 illustrate various screen displays according to the present invention which can be presented on the display device 30 to provide service information to the subscriber. FIG. 5 illustrates the presentation of an information banner 120 which can be presented simultaneously with a tuned program 122, whereby a portion of the tuned program is subservient to the information banner 120. The information banner 120 could be, for example, presented upon activation of the INFO Key 104 or the enter key 112 of the user input device 40 (FIG. 4). While the information banner 120 is horizontally disposed across the lower portion of the screen, the information banner 120 may be disposed in other orientations and in other locations. For instance, the information banner 120 may be disposed vertically along the right or left side of the screen. Moreover, the subscriber may be able to change the position of the information banner 120, if desired. This may be particularly useful if the information banner 120 is covering a portion of the tuned program that the subscriber wants to view.

The information banner 120 preferably includes service information 124, such as a logo image 126, a short description 128, and a channel number 130. In addition, the information banner 120 may include program information 132 and the beginning and ending times 134 of the tuned program 122. It should be noted that the data presented within the information banner 120, as described above, is merely illustrative of the type and variety of data that may be presented.

A browse indicator 136 of the information banner 120 may be displayed to indicate to the subscriber that the browse mode is activated and that browsing can be performed according to the current ordering scheme of program services. For instance, the current ordering scheme may be by channel number, and therefore, the subscriber may browse through the channels in numerical sequence. The subscriber may enter the browse mode by inputting a command via the user input device 40, such as by selecting an arrow key 110 thereby causing the browse indicator 136 to appear. Once activated, the browse mode allows the subscriber to browse the program services by activating the scrolling keys 110, without changing the tuned program 122. Otherwise, when not in the browse mode, the activation of the scrolling keys 110 causes the tuned program 122 to change according to channel number sequence.

In accordance with the present invention, the subscriber is not limited to a single ordering scheme in which to browse the program services offered by television system 12, 12', but is given the flexibility to select among a plurality of ordering schemes which group and sort the available program services for more efficient browsing by subscriber. For example, the subscriber may select from an ordering scheme which sorts the program services alphabetically by short description, alphabetically by sort description with logo, alphabetically by long description, etc. Thus, the subscriber is not relegated to browsing the services by channel number, but is able to select an ordering scheme of choice. This may be particular advantageous when the user has a service in mind, but does not remember the channel number of that service. The subscriber only needs to remember a single attribute by which the subscriber can order the services in order to locate the service desired. Moreover, the subscriber may browse according to the application or according to a search query; the subscriber has the ability to choose which would be most efficient.

Figure 6:
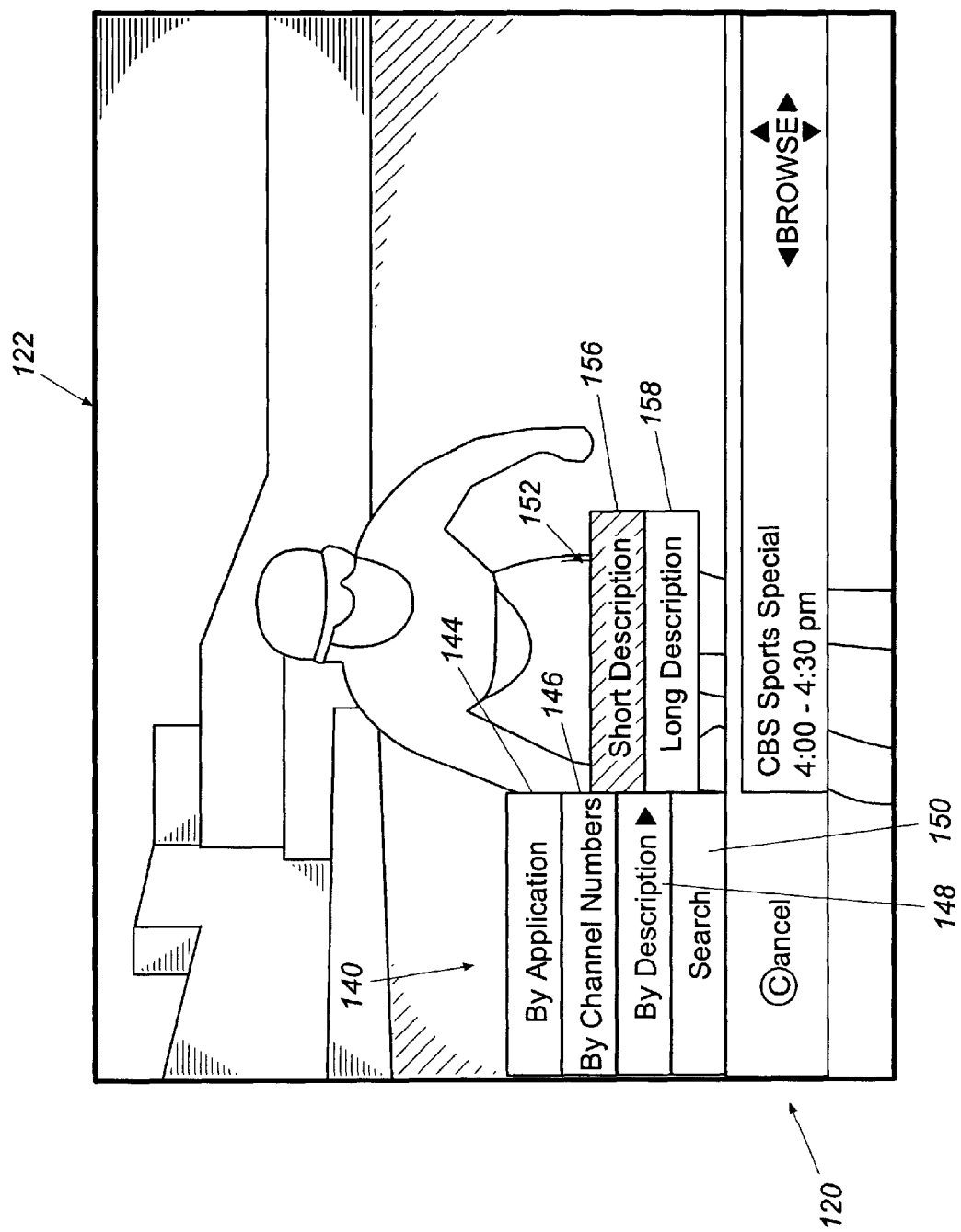

For example, with reference to FIG. 6, a subscriber may select the browse key 106 of the user input device 40 in order to enter an ordering scheme selection mode in which the subscriber may select an ordering scheme for browsing services. Upon selecting the browse key 106, a menu 140 may be presented in conjunction with the information banner 120. While the menu 140 is illustrated as a pop-up menu in FIG. 6, it will be appreciated by those of ordinary skill in the art that the menu 140 may appear as a drop-down menu or a laterally extending menu depending upon the position and orientation of the information banner 120. The menu 140 provides the ordering scheme options to the subscriber. For purpose of the present embodiment, the ordering scheme options include a by application option 144, by channel number option 146, by description option 148, and by search option 150. When in the ordering scheme selection mode, the subscriber may use the scrolling keys 110 to move the selection cursor 152 between the various options. In addition, the options provided may be hierarchical, providing one or more subsequent selections between ordering scheme options at a lower level. For instance, the by description option 148 leads to a short description option 156 and a long description option 158.

Once the subscriber has identified the ordering scheme of choice using the selection cursor 152, the subscriber may select the enter key 112 to implement the ordering scheme in terminal 10. For example, the subscriber may select the short description option 156, as illustrated in FIG. 6, which causes the processor 36 to retrieve (or generate) a display table 90 associated with the short description ordering scheme for mapping the services from service table 64. Accordingly, the subscriber may then enter the browse mode to browse the services according to the short description of the services, presumably in alphabetical order.

Alternatively, the function keys 108 may be programmed to change the terminal 10 to a pre-selected ordering scheme. For instance, by selecting a function key 108, the ordering scheme may be automatically changed to alphabetical by short description, alphabetical by logo, alphabetical by long description, etc. This may be particularly useful when the subscriber is not sure as to which attribute they wish to search, and therefore, wish to toggle between various ordering schemes in an efficient and expedited manner.

Figure 7:
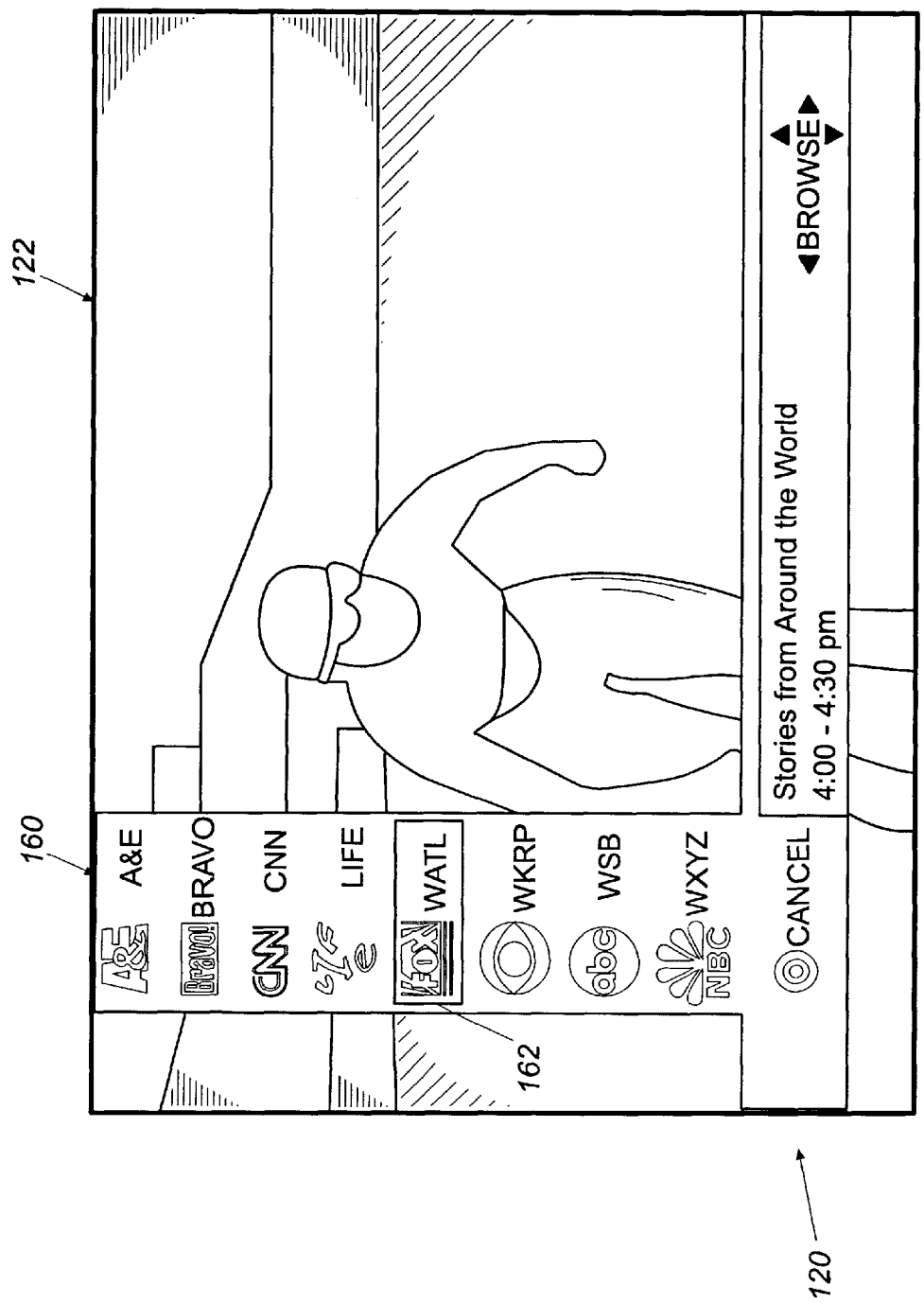

Accordingly, illustrated in FIG. 7 is a service browseable listing 160 that includes service logo and short description. The service listing 160 is presented to the subscriber when the subscriber enters the particular browse mode, as discussed above. For example, the user may select the enter key 112 so as to cause the terminal 10 to enter into browse mode and to cause the service listing 160 to be presented. The subscriber may then utilize the activation keys 110 to scroll through the listing of services provided by the service listing 160, wherein the scrolling cursor is identified by a selection box 162. While scrolling through the service listing 160, the subscriber may select the highlighted service by pressing the enter key 112. Upon doing so, the display 122 will change to that selected by the subscriber.

Figure 8:
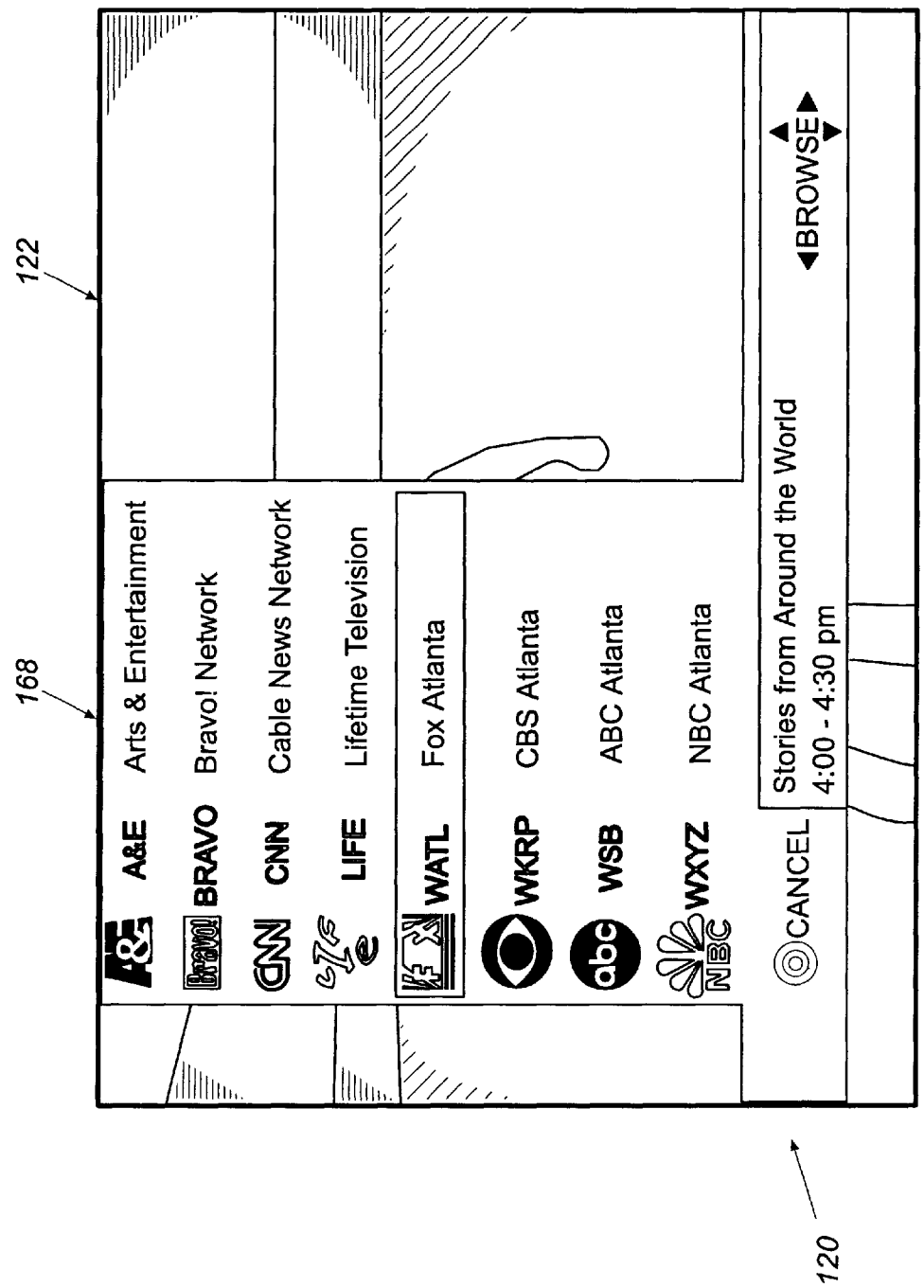
Figure 9:
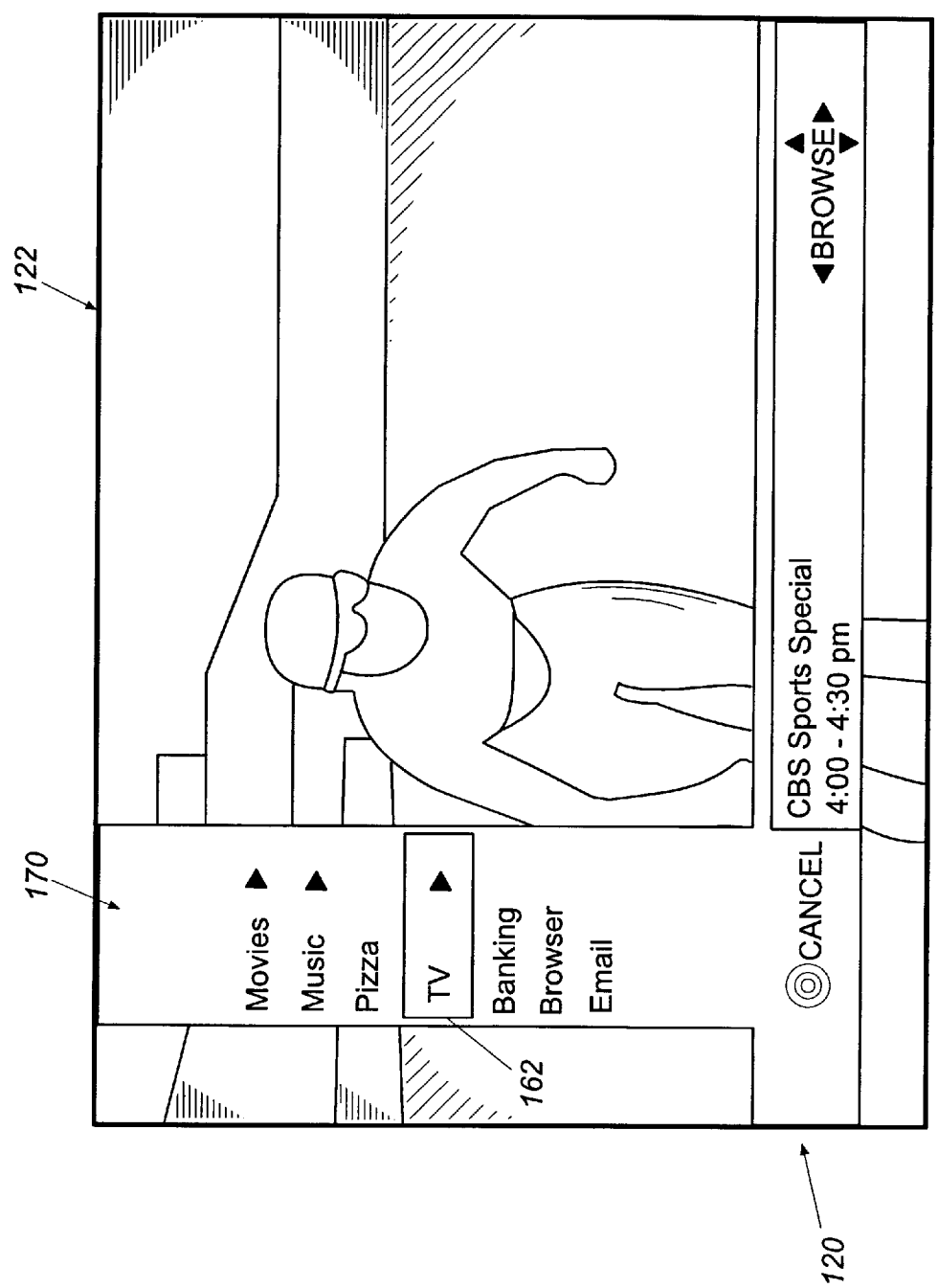
Figure 10:
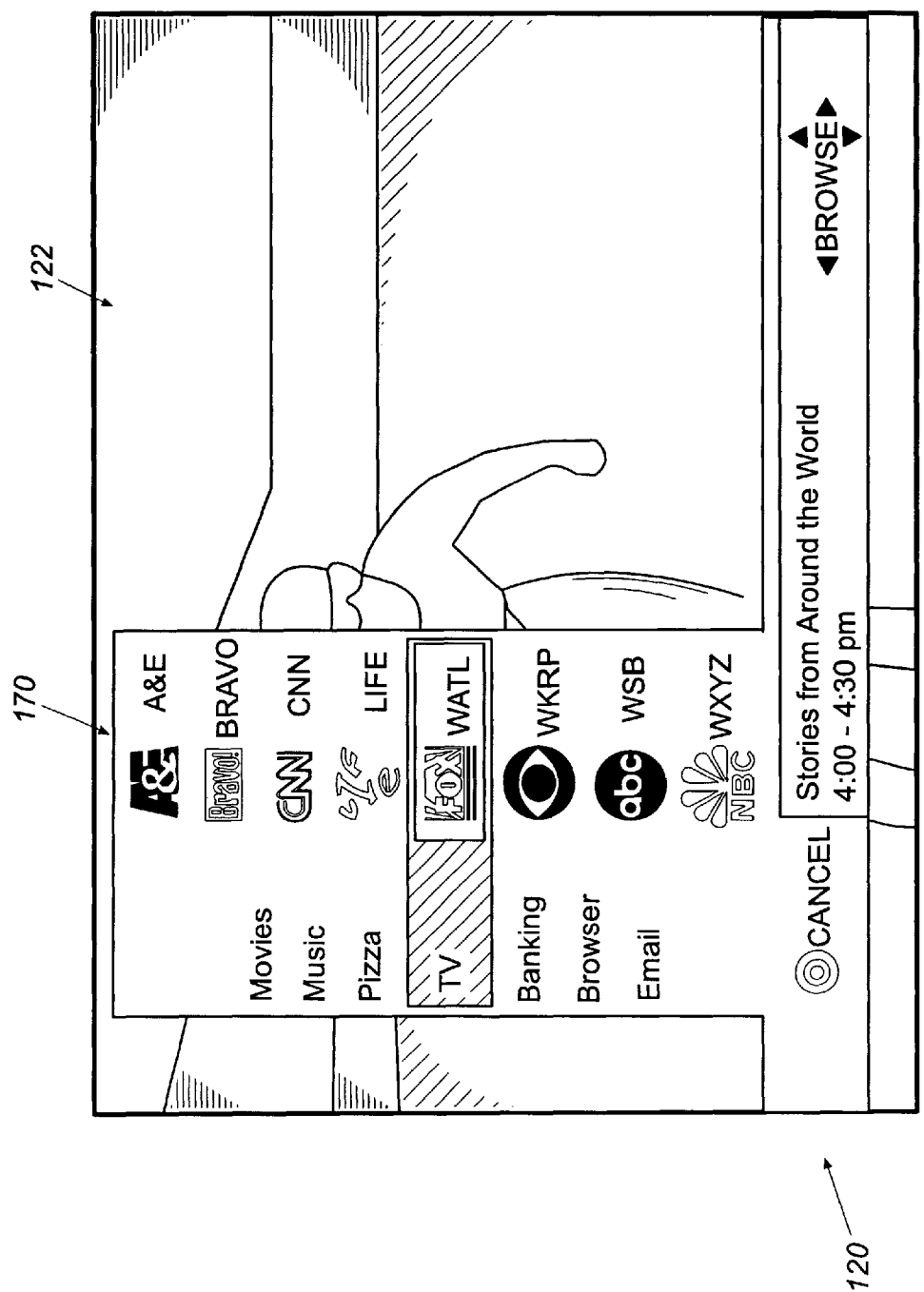

With reference to FIG. 8, illustrated is a service listing 168 for the ordering scheme according to long description and logo. This service listing 168 functions in substantially the same manner as the program service listing 160 described above. FIG. 9 illustrates a service listing 170 according to the application associated with the various services. As illustrated by the service listing 170, for each application that provides multiple services there is a sub-listing of services associated with that application, as illustrated in FIG. 10. In FIG. 10, the selection box 162 has been placed over the TV application which causes a listing of services associated with television viewing to be presented to the user for browsing.

Figure 11:
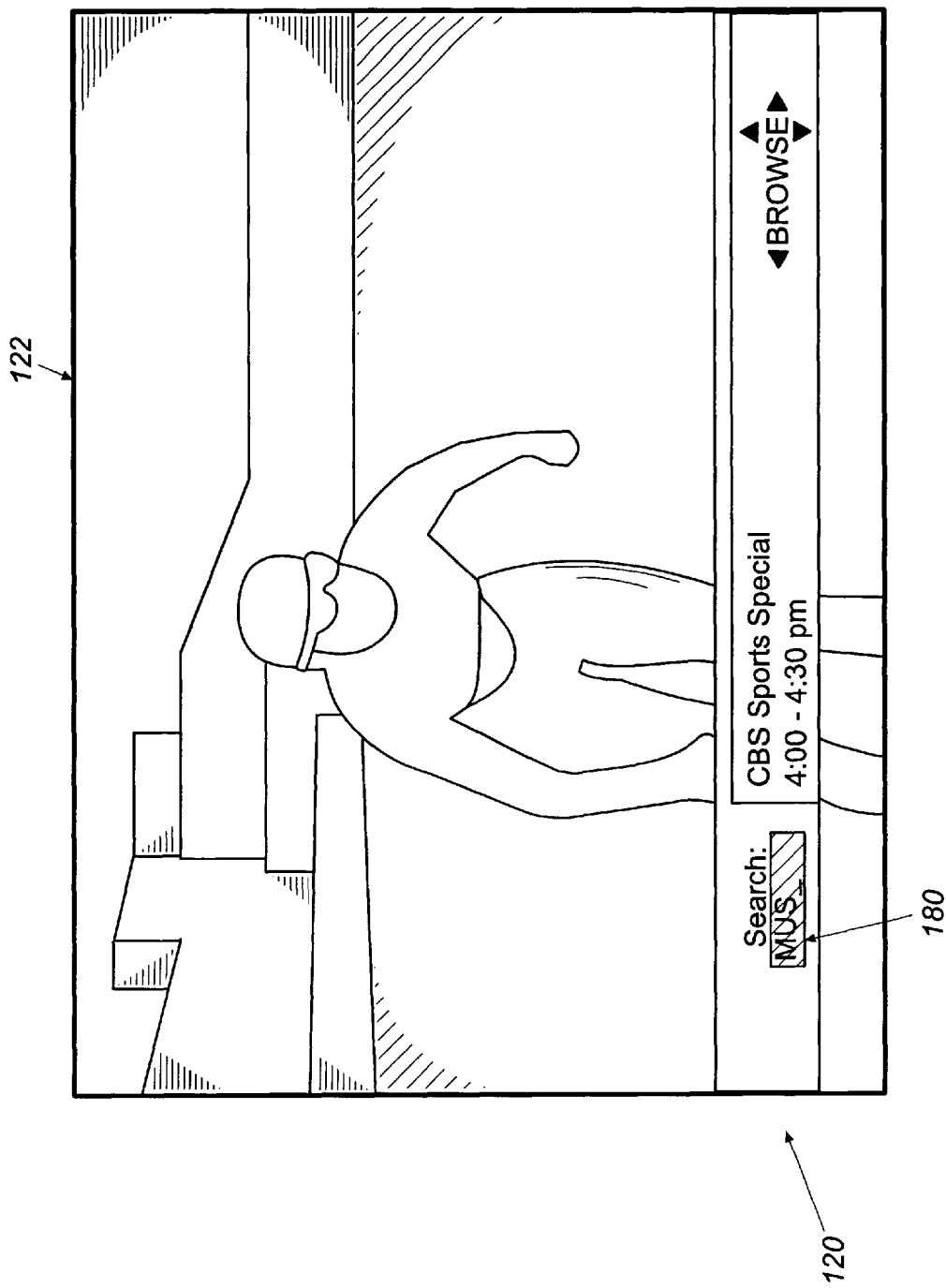
Figure 12:
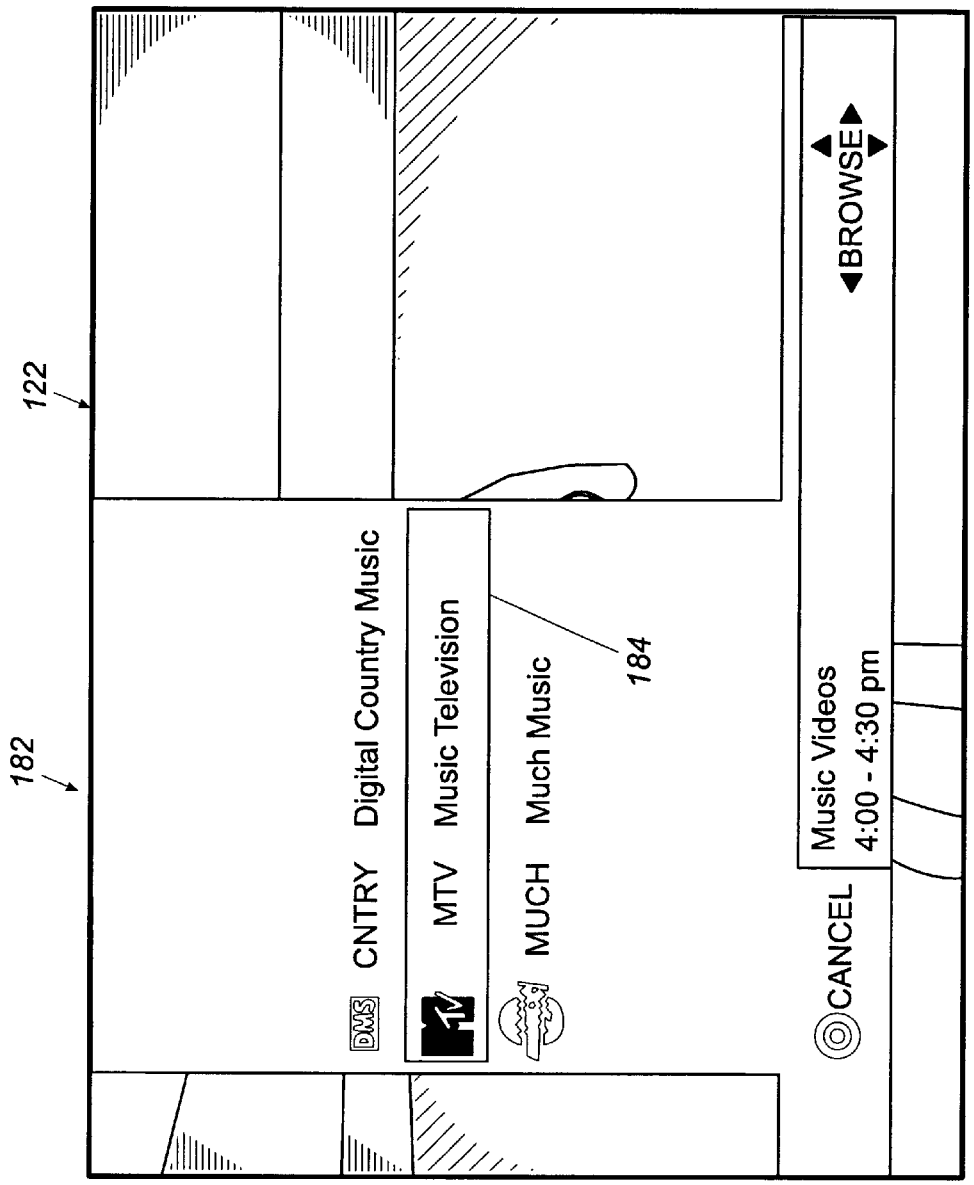

With reference to FIG. 11, yet another option available to the subscriber is the search option 150. By selecting the by search option 150 of menu 140, the subscriber is presented a search text field 180 in conjunction with information banner 120. The subscriber may enter a search query (e.g., "MUS") using the alphanumeric keypad 114 of user input device 40. Upon entering the search query, the user may select the enter key 112, causing the searcher 52 of the navigator 46 to locate those services which include the search query as an attribute. As illustrated in FIG. 12, the search results from search 52 are presented to the subscriber as a service listing 182. The subscriber can then select a service in the service listing 182 via selection box 184, as discussed above.

Figure 13:
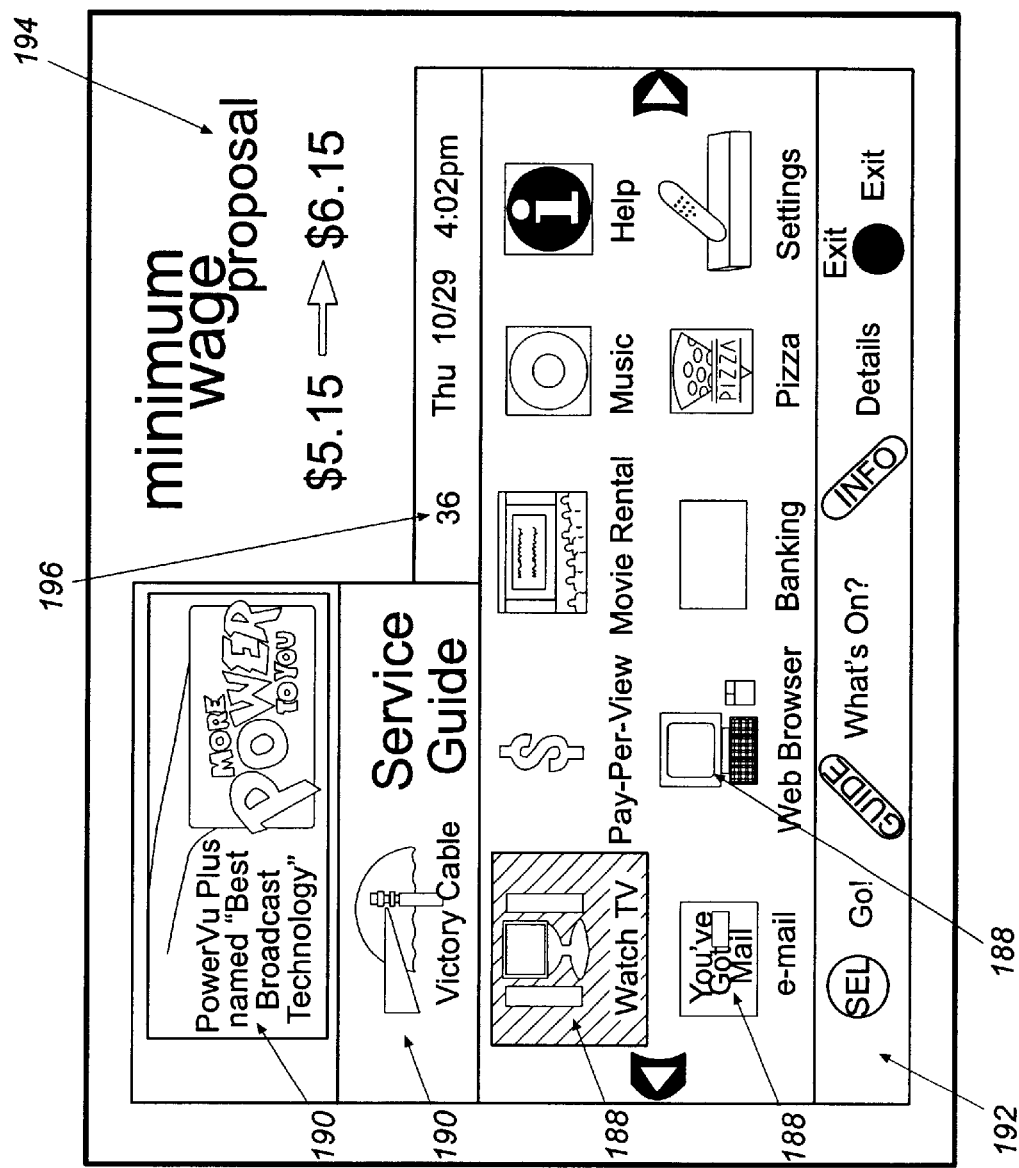
Figure 14:
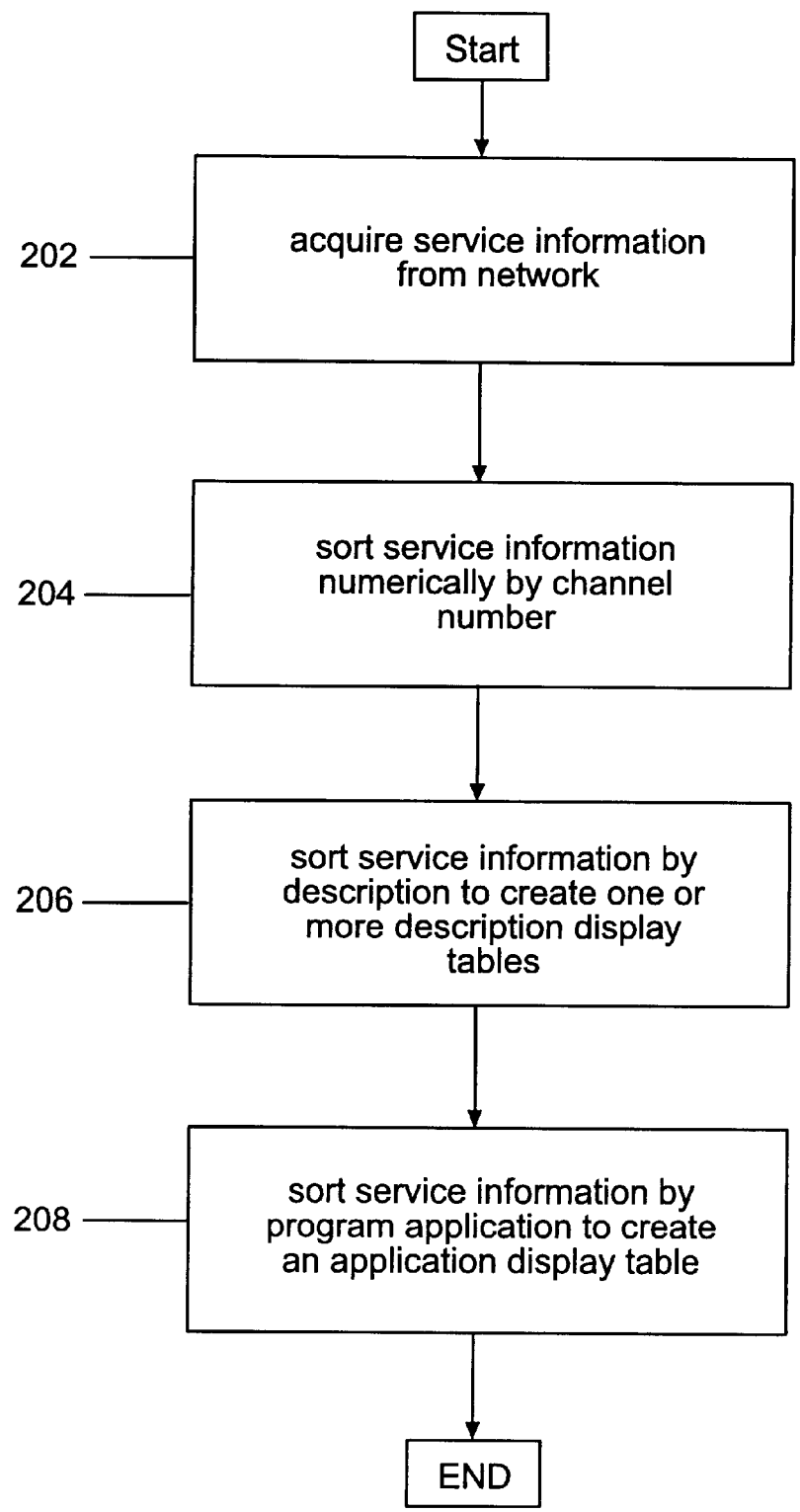
FIGS. 14–17 are flowcharts illustrating the operation of an embodiment of the present invention.

With reference to FIG. 13, illustrated is a list of services referred to herein as the service guide 186 for purposes of the present embodiment, as specified by the headend 14, 14' and loaded from the network 12, 12'. In the present embodiment, the service guide is accessed by the subscriber selecting one of the function keys 108 on the user input device 40. The contents and layout of the screen are specified using display formatting information within a display language (such as HTML in the present embodiment, extended with new domain-specific tags, such as with XML), that directs the navigator 46 how to present the information. The formatting information also includes the actual service in the service table 62 to activate for each of the services 188 listed. This allows the subscriber to utilize the cursor keys 110 to highlight a particular service 188 and press the enter key 112 to change the display. Upon doing so, the display 122 will change to the highlighted service selected by the subscriber.

Based on the display formatting information, the navigator 46 may allow the user to press other function keys 108 on the user input device 40 to gain more information about the highlighted service. In the present embodiment this includes displaying an interactive program guide showing all programs provided by the service or displaying more information about the service as specified in the service listing information downloaded from the headend 14, 14'. The service guide is entirely configurable according to the display formatting method (e.g., HTML) by the system operator and can also include graphical images 190 for advertising or branding, as well as the instructions 192 for the subscriber on the screen. The upper-right-hand corner of the service guide of FIG. 13 shows a partial screen version 194 of the service being provided on the channel 196 to which the terminal 10 was tuned when the service guide was entered.

With reference to FIGS. 14–17, a method of operation and sequence of events according to an embodiment of the present invention is illustrated. With specific reference to FIG. 14, a terminal 10 initially acquires service information from a network 12, 12', as indicated by block 202. The service information is then sorted numerically by channel number to create a channel display table, as indicated by block 204. At block 206, the service information is sorted by description to create one or more description display tables. For instance, there may be a description display table according to short description, long description, etc. At block 208, the service information is sorted by service application to create an application display table. Accordingly, blocks 204–208 provide for the pre-generated display tables which may be stored in memory until utilized. Alternatively, as described above, the display tables may be dynamically generated at the time a particular ordering scheme is requested by the subscriber.

Figure 15:
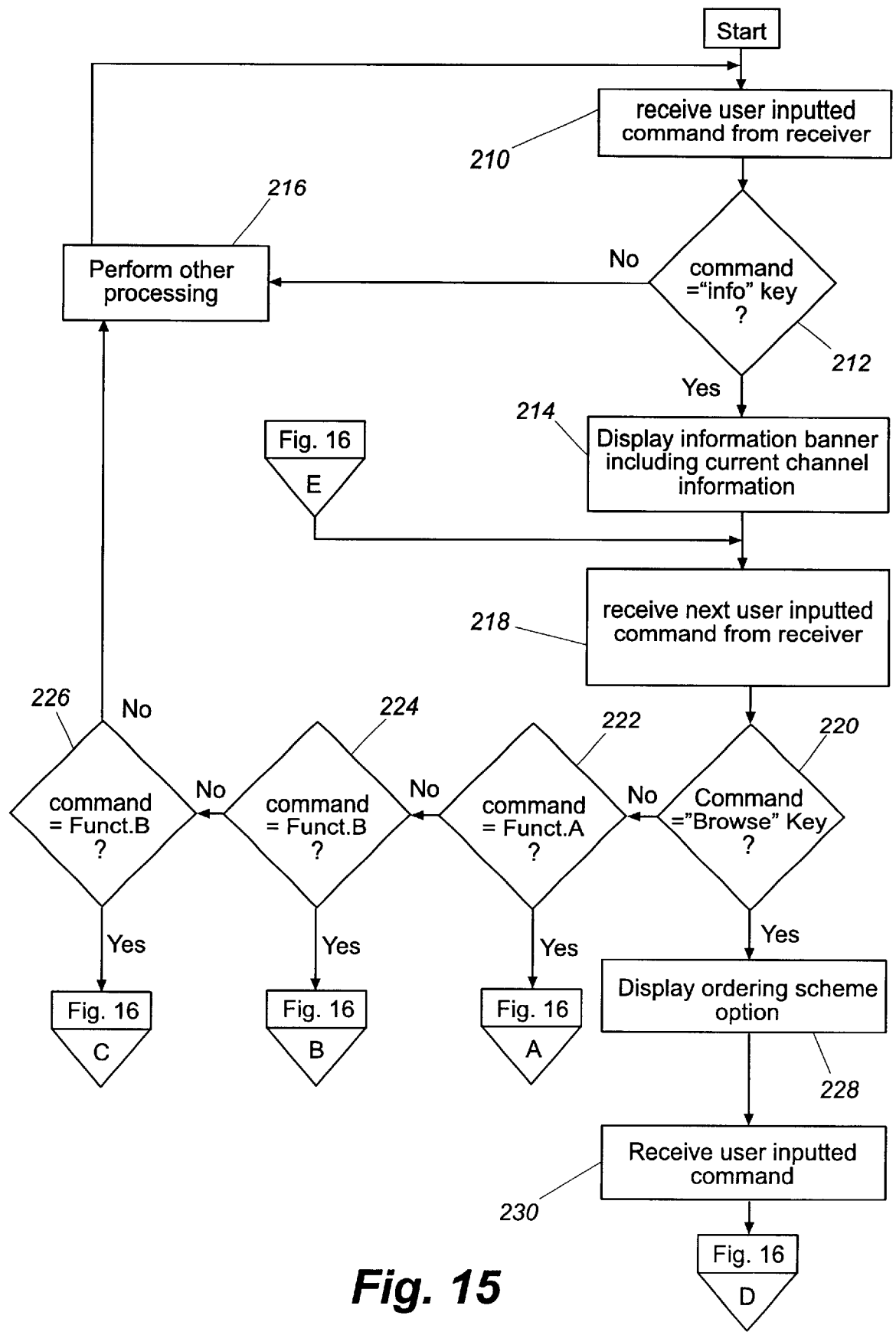
Figure 16:
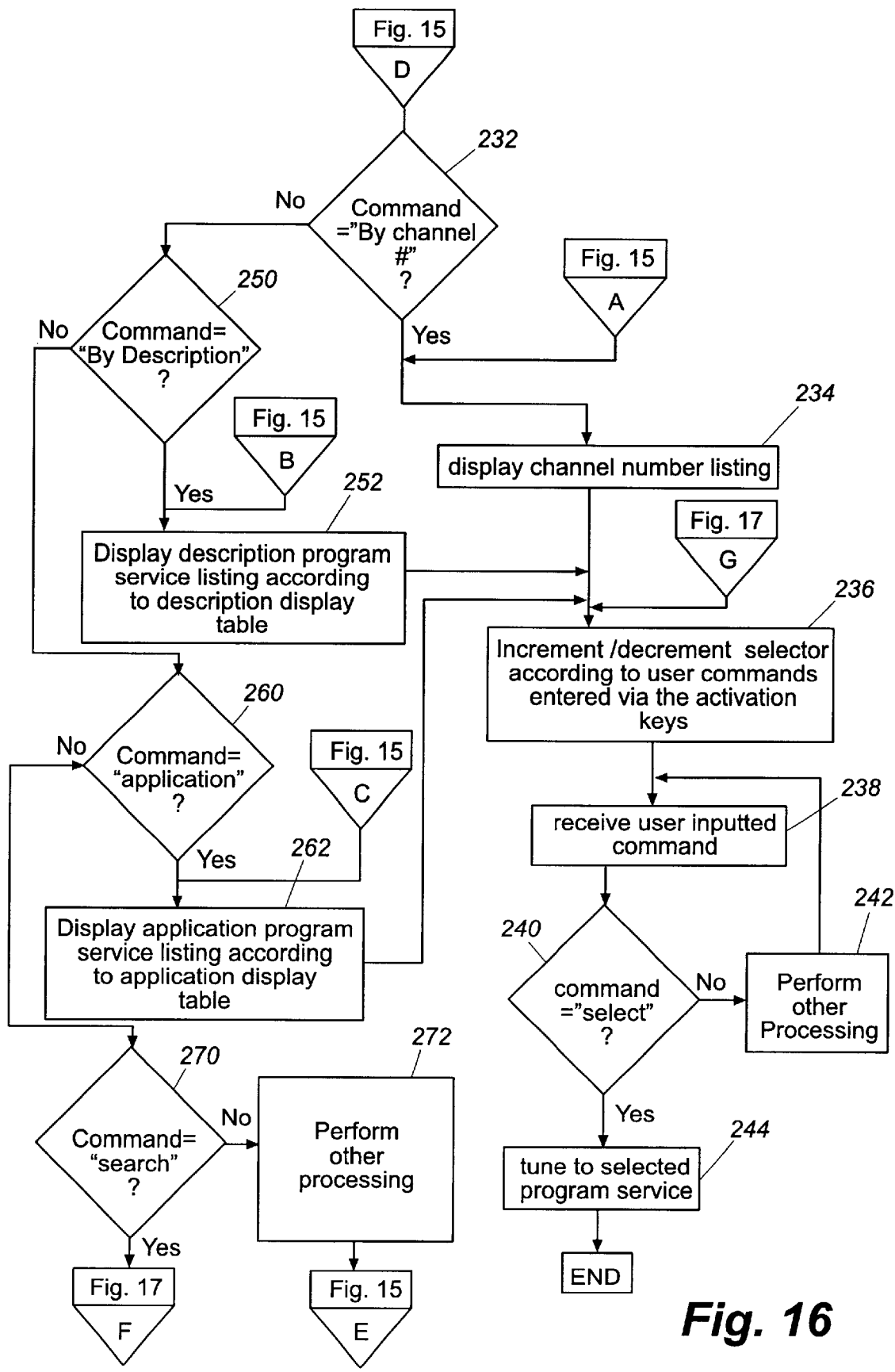
Figure 17:
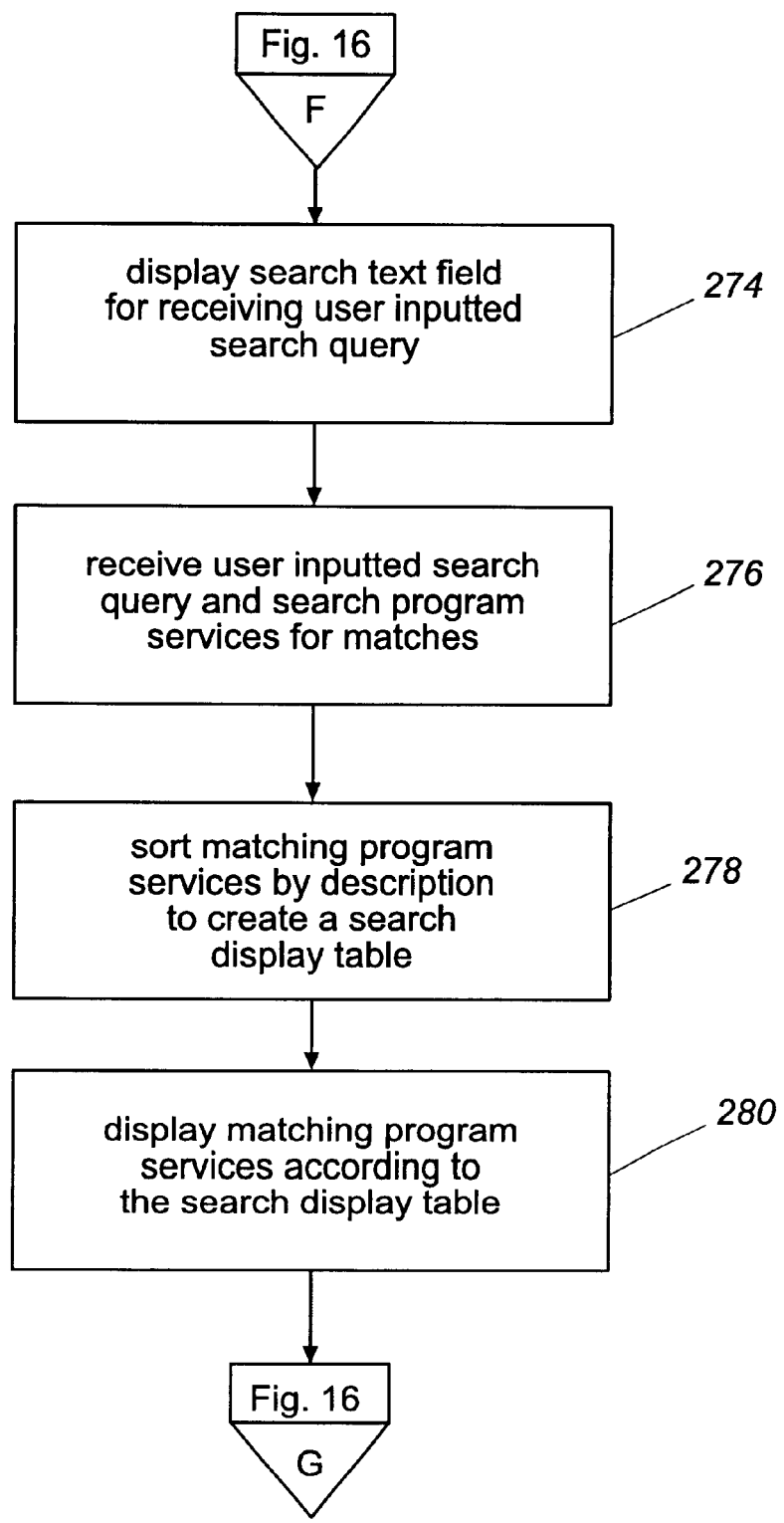

With general reference to FIGS. 15–17, an ordering scheme selection method in accordance with an embodiment of the present invention is described. At block 210, a user inputted command is received by the receiver 38 of the terminal 10. If the command represents the selection of the INFO key 104 of the user input device 40, as detected by block 212, then the information banner 120 is displayed to the subscriber, as indicated by block 214. If the received command does not represent the selection of the INFO key, then the terminal 10 performs other processing, as indicated by block 216. If the information banner 120 has been displayed to the subscriber, as indicated in block 214, then the terminal 10 waits to receive the next user inputted command from the receiver, as indicated by block 218. Once received, it is then determined at block 220 whether the next user inputted command represents the selection of the browse key 106. If it does not, then it is determined whether the command represents the selection of the Function A key 108, Function B key 108, or Function C key 108, as determined by blocks 222, 224 and 226, respectively. If the command is neither the selection of Functions A, B or C keys, then other processes are performed at block 216. Alternatively, if it is determined that the command is the selection of any one of the Function A, B or C keys, then the terminal 10 changes to the ordering schemes associated with the selected function key 108, as described below in connection with FIGS. 16 and 17.

If it is determined at block 220 that the command is the selection of the browse key 106, then the ordering scheme options are displayed to the subscriber, such as by menu 140, as indicated by block 228. The terminal 10 then receives the next user inputted command at block 230 which is processed at block 232 to determine if the command is the selection of the by channel number option 146.

If the subscriber has selected the by channel number option, as determined by block 232, a service listing by channel number is displayed to the subscriber, as indicated by block 234. The subscriber may then increment or decrement the selected box according to the commands entered via the activation keys 110, as indicated by block 236. Upon receiving a user inputted command at block 238, it is determined at block 240 whether the command is that of the enter key 112. If it is not, then other processing is performed according to the command at block 242, and the terminal 10 awaits the next user inputted command at block 238. If it is detected at block 240 that the command is the selection of the enter key 112, then the service identified by the selection box is tuned, as indicated by block 244.

If it is determined at block 232 that the command was not the selection of the by channel number option, it is determined at block 250 whether the command was the selection of the by description option 148. If it is determined at block 250 that the subscriber selected the by description option 148, then a service listing according to the description display table is displayed to the subscriber, as indicated by block 252. It should be noted at this point that the present invention provides for the hierarchical configuration of options such that the subscriber may be presented with further options, such as between the long description or the short description. Following the display of the services according to description, the substantially same steps of block 236–244 are performed by the terminal 10.

If it is determined at block 250 that the command was not the by description option, then it is determined at block 260 whether the command was the selection of the by application option. If the command represents the selection of the by application option, as determined by block 260, a listing of applications according to the application display table is displayed to the subscriber at block 262. Next, the substantially same steps of blocks 232–244 are performed by terminal 10.

If it is determined at block 260 that the command was not the selection of the by application option, then it is determined at block 270 whether the command was the selection of the search option. If the command was not the selection of the search option, as determined at block 270, then other processing is performed at block 272. Otherwise, a search text field 180 is displayed to the subscriber for receiving a user inputted search query, as noted by block 274. A user inputted search query is then received and a search for services matching the search query is performed by the terminal 10, as indicated by block 276. The services that match the service query are then sorted by description to create a search display table, as indicated by block 278. The matching services according to the search display table are displayed to the subscriber, as indicated by block 280. Next, substantially same steps of blocks 236–244 are performed by terminal 10.

A further variation on this embodiment is the addition to the service listing 140 in FIG. 6 of an option to redefine the ordering of services as the channel increment/decrement key 115 on the user input device 40 shown in FIG. 4 is selected by the user. The default function of such a key is to move to the next/previous channel numerically. One of the options in listing 140 would be to change to the next/previous channel alphabetically by service short description.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A terminal for providing services to a user in a user selected order, each service being defined by service attributes, the terminal comprising:

a memory that stores a service table that relates service attributes to each service;

a processor that receives a user inputted command identifying an ordering scheme for displaying the services, wherein the ordering scheme is based on at least one service attribute, and in response thereto, displays a listing of services based on a display table mapping services of the service table according to the identified ordering scheme.

2. The terminal of claim 1, further comprising a communication port that connects the terminal to a communications network distribution node, wherein the communication port receives an updated service table from the distribution node, and stores the updated service table in the memory.

3. The terminal of claim 1, wherein the processor further includes a search engine that searches the services based on a user inputted search query, and generates therefrom a display table mapping the services that match the query for display to the user.

4. The terminal of claim 1, wherein the ordering scheme is based on at least one service attribute.

5. The terminal of claim 4, wherein the service attributes are selected from a group consisting of long description, short description, and service application.

6. The terminal of claim 1, further comprising a user interface for displaying the services according the display table to the user.

7. The terminal of claim 6, further comprising a display device, wherein the user interface displays the services to the user via the display device.

8. The terminal of claim 6, wherein the user interface includes a browser banner having a service-listing portion at which at least one selectable service is displayed to the user.

9. The terminal of claim 8, wherein the service-listing portion includes a pop-up list.

10. The terminal of claim 6, wherein the terminal includes a user input device for providing user inputs to the processor.

11. The terminal of claim 1, wherein the processor generates the display table mapping services of the service table according to at least one service attribute.

12. A navigator for displaying services to a user in a user selectable ordering scheme via a display, each service being defined by at least one service description, said navigator comprising:

a navigation controller that receives a user inputted command identifying an ordering scheme, and in response thereto, maps the services in a display table according to the identified ordering scheme;

a user interface for displaying the listing of services to the user, wherein the listing is based upon the display table.

13. The navigator of claim 12, wherein the ordering scheme is based on at least one service attribute associated with each service.

14. The navigator of claim 13, wherein the service attributes are selected from a group consisting of long description, short description, and service application.

15. The navigator of claim 12, wherein the navigator controller further includes a search engine that searches the services based on a user inputted search query, and generates therefrom a display table mapping the services that match the query for display to the user via the user interface.

16. The navigator of claim 12, wherein the user interface includes a browser banner having a service-listing portion at which at least one selectable service is displayed to the user.

17. The navigator of claim 12, wherein the service listing portion includes a pop-up list.

18. The navigator of claim 12, wherein the user-interface utilizes a display language for presenting the services.

19. A method for ordering a plurality of services displayed on a display device, each service being defined by service attributes related to the service by a service table, comprising:

receiving a user inputted command identifying an ordering scheme for displaying services, wherein the ordering scheme is based on at least one service attribute; and in response to the command, displaying a service listing to the user via the display device, wherein the service listing includes the services ordered according to a display table ordering the services according to the identified ordering scheme.

20. The method of claim 19, further comprising generating the display table mapping the services according to at least one service attribute.

21. The method of claim 19, wherein the step of generating the display table includes ordering the services according to a service description.

22. The method of claim 20, wherein the step of generating the display table includes ordering the services alphabetically according to the service description.

23. The method of claim 19, wherein the step of generating the display table includes ordering the services according to a service application.

24. The method of claim 19, further including receiving an updated service table.

25. The method of claim 19, wherein the user inputted command defines a search query, and further including the steps of searching the services based on the search query to identify the services displayed.

* * * * *

UNITED STATES PATENT AND TRADEMARK OFFICE
CERTIFICATE OF CORRECTION

PATENT NO.   : 6,463,586 B1
DATED        : October 8, 2002
INVENTOR(S)  : Jerding It is certified that error appears in the above-identified patent and that said Letters Patent is hereby corrected as shown below:

<u>Title page,</u>
Item [57], ABSTRACT,
Line 1, insert -- is disclosed -- after "terminal".

<u>Column 4,</u>
Line 55, insert a period after "invention".

<u>Column 7,</u>
Line 5, delete "rom" and insert therefore -- from --.
Line 65, delete "(ie.," and insert therefore -- (i.e., --.

Signed and Sealed this

Fourth Day of March, 2003

JAMES E. ROGAN
*Director of the United States Patent and Trademark Office*